United States Patent
Hara et al.

(10) Patent No.: US 6,714,998 B2
(45) Date of Patent: Mar. 30, 2004

(54) DISTRIBUTED PROCESSING SYSTEM AND ITS CONTROL METHOD

(75) Inventors: Katsuhiko Hara, Kanagawa (JP); Masahito Yamamoto, Tokyo (JP); Jun Miyajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 478 days.

(21) Appl. No.: 09/805,883

(22) Filed: Mar. 15, 2001

(65) Prior Publication Data

US 2001/0023461 A1 Sep. 20, 2001

(30) Foreign Application Priority Data

Mar. 16, 2000 (JP) ........................................ 2000-074826

(51) Int. Cl.[7] ................................................ G06F 3/00
(52) U.S. Cl. ............................. 710/10; 710/8; 710/104; 710/62; 709/321; 709/322; 709/201; 709/220
(58) Field of Search ............................... 710/8, 10, 62, 710/104; 709/201, 220, 321, 322

(56) References Cited

U.S. PATENT DOCUMENTS

| | | | | |
|---|---|---|---|---|
| 5,371,837 A | * | 12/1994 | Kimber et al. | 358/1.15 |
| 5,467,434 A | * | 11/1995 | Hower et al. | 358/1.15 |
| 5,564,109 A | * | 10/1996 | Snyder et al. | 710/8 |
| 5,692,111 A | * | 11/1997 | Marbry et al. | 358/1.15 |
| 6,347,294 B1 | * | 2/2002 | Booker et al. | 703/28 |
| 6,349,304 B1 | * | 2/2002 | Boldt et al. | 707/102 |

* cited by examiner

*Primary Examiner*—Kim Huynh
*Assistant Examiner*—Mike Nguyen
(74) *Attorney, Agent, or Firm*—Fitzpatrick, Cella, Harper & Scinto

(57) ABSTRACT

This invention has as its object to reduce network traffic when a remote copy process is done using network devices. To achieve this object, a computer (13) acquires stub drivers (610, 612) from image input/output devices (12-1, 12-2) (S1601, S1602), and sends the stub driver (610) to the image input/output device (12-1) (S1605). The image input/output device (12-1) drives the image input/output device (12-2) by executing the received printer stub driver (610), sends scanned data, and makes the image input/output device (12-2) print the data.

31 Claims, 21 Drawing Sheets

FIG. 10

INFORMATION — DEVICE OPTION — PAGE COMPOSER

| DETAILS | MAIN | PAPER | LAYOUT | OVERLY |

PAPER SIZE (Z):
A4

OUTPUT PAPER (O):
A4

☐ ZOOM RATIO (F):

PAGE LAYOUT:

PAGE COUNT (U): 1 PAGE PRINT

PRINT DIRECTION: ⦿ PORTRAIT (P)  ○ LANDSCAPE (L)

PAPER SOURCE (S): AUTO

NUMBER OF COPIES (C): 1

MORE DETAILS (M)   REVERT TO DEFAULT (D)

OK   CANCEL   APPLY (A)   HELP

FIG. 18

| REGISTRATION DATE | PERIPHERAL DEVICE NAME | SERVICE CONTENTS | STUB DRIVER |
|---|---|---|---|
| 1998.12.19 | IMAGE INPUT / OUTPUT DEVICE 12-1 | PDL PRINT SERVICE | 608-1 |
| 1998.12.19 | IMAGE INPUT / OUTPUT DEVICE 12-1 | PRINT SERVICE | 610-1 |
| 1998.12.19 | IMAGE INPUT / OUTPUT DEVICE 12-1 | SCAN SERVICE | 612-1 |
| 1998.12.19 | IMAGE INPUT / OUTPUT DEVICE 12-1 | FAX MODEM RECEIVE SERVICE | 614-1 |
| 1998.12.19 | IMAGE INPUT / OUTPUT DEVICE 12-1 | FAX MODEM SEND SERVICE | 616-1 |
| 1998.12.23 | IMAGE INPUT / OUTPUT DEVICE 12-2 | PDL PRINT SERVICE | 608-2 |
| 1998.12.23 | IMAGE INPUT / OUTPUT DEVICE 12-2 | PRINT SERVICE | 610-2 |
| 1998.12.23 | IMAGE INPUT / OUTPUT DEVICE 12-2 | SCAN SERVICE | 612-2 |
| 1998.12.23 | IMAGE INPUT / OUTPUT DEVICE 12-2 | FAX MODEM RECEIVE SERVICE | 614-2 |
| 1998.12.23 | IMAGE INPUT / OUTPUT DEVICE 12-2 | FAX MODEM SEND SERVICE | 616-2 |

1801

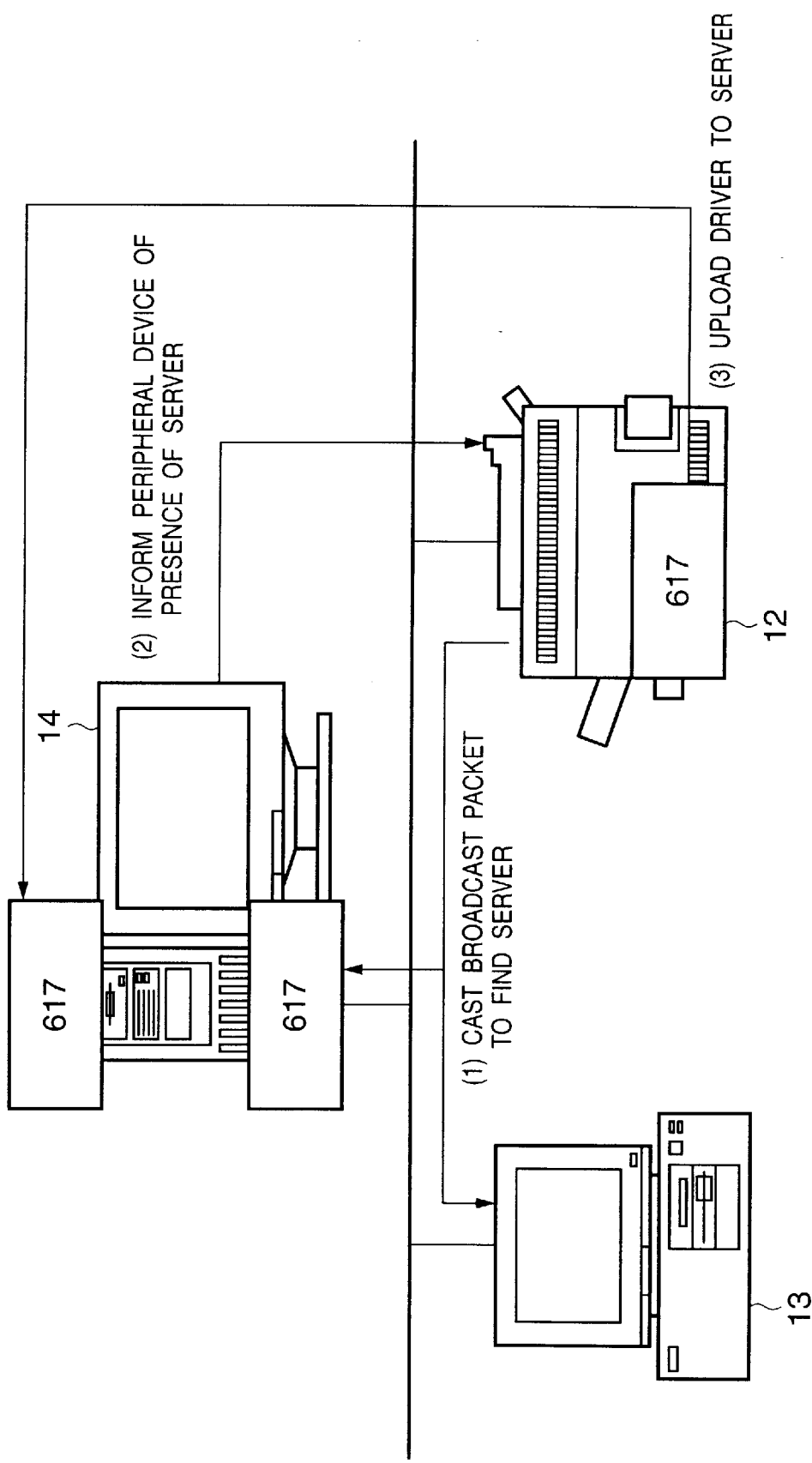

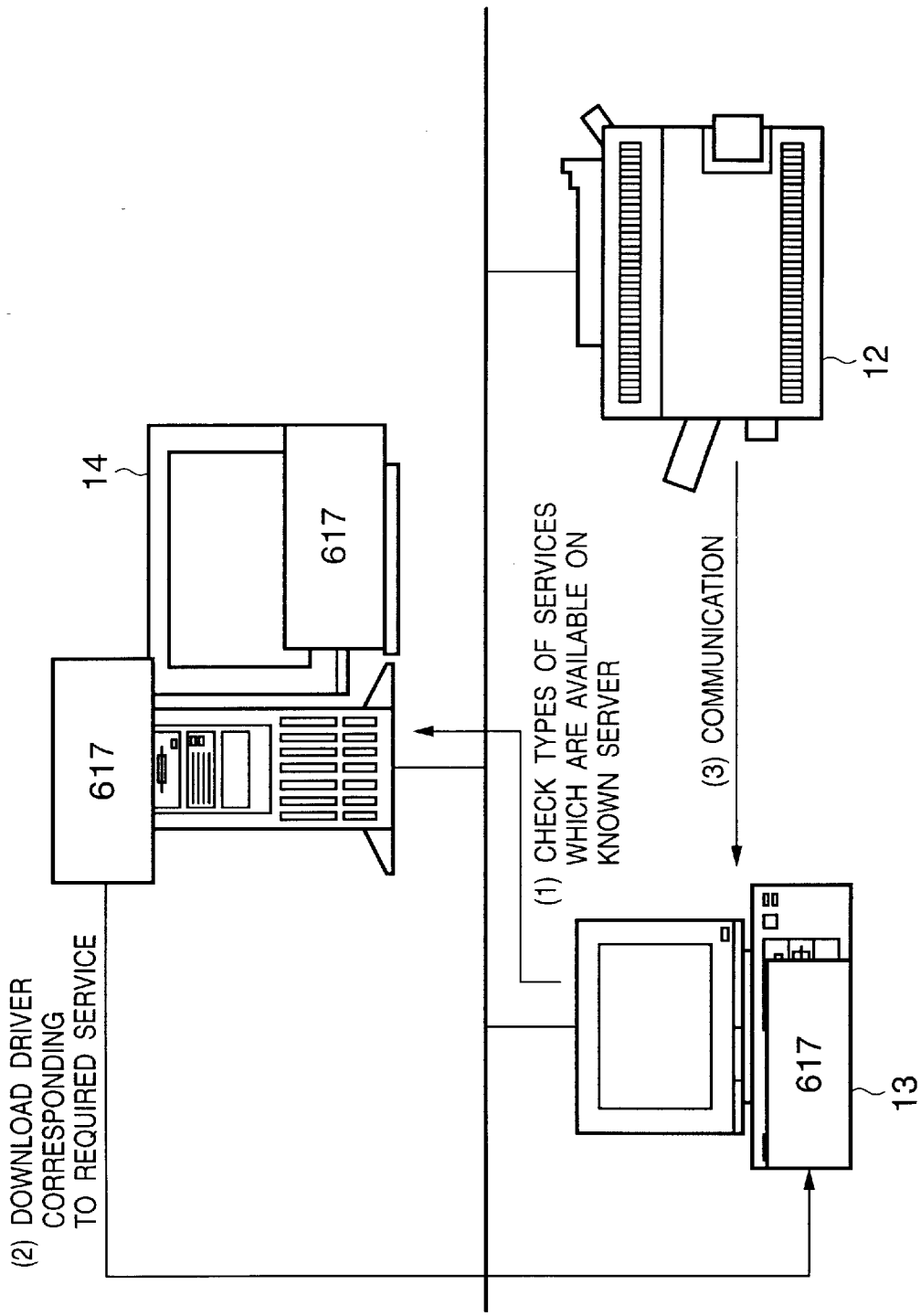

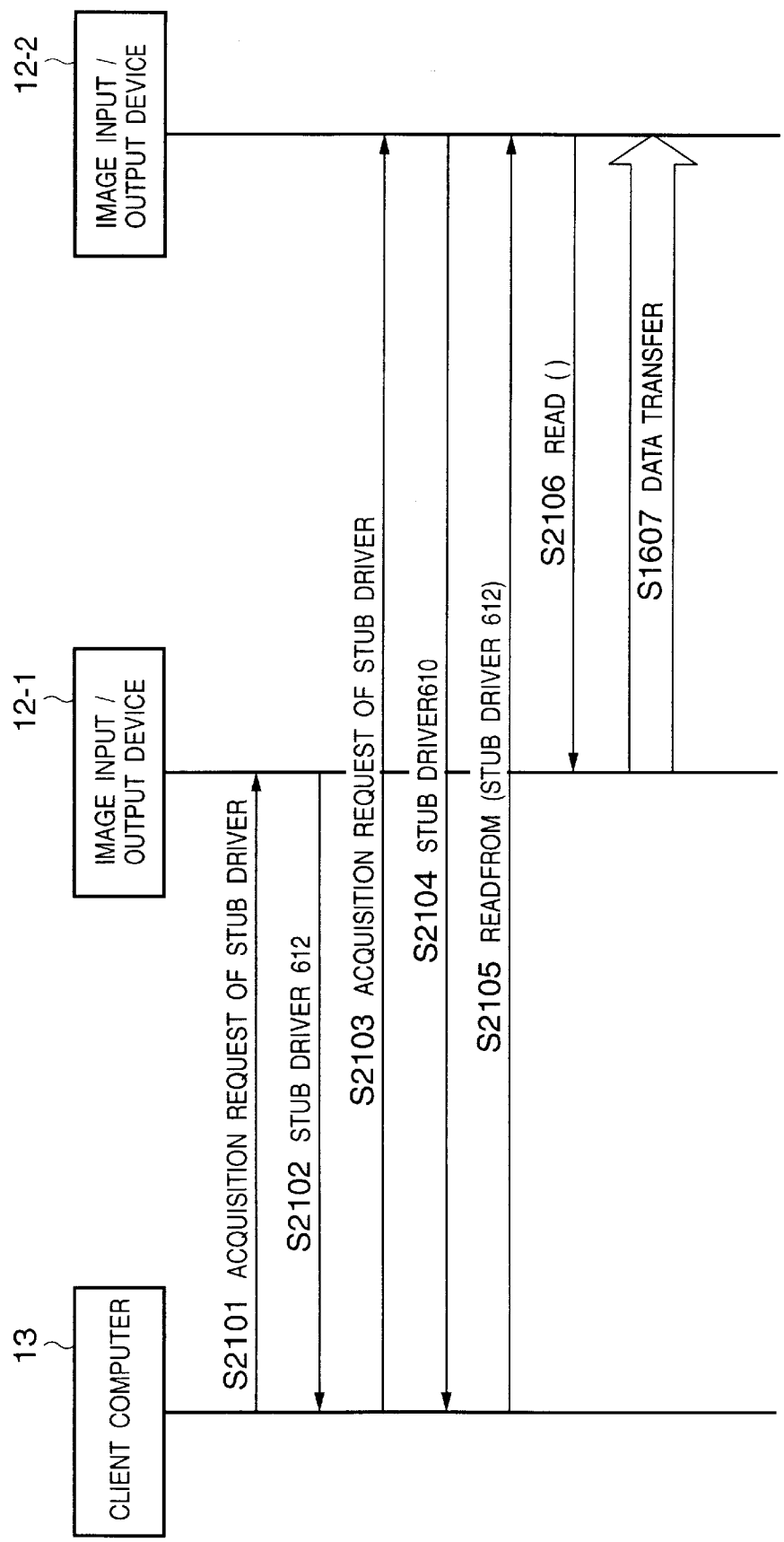

DISTRIBUTED PROCESSING SYSTEM AND ITS CONTROL METHOD

FIELD OF THE INVENTION

The present invention relates to a distributed processing system which provides a composite function by combining independent functions such as a data input function, data output function, and the like, and its control method.

BACKGROUND OF THE INVENTION

Conventionally, a distributed document processing system that connects independent function devices such as input devices including an image scanner, digital camera, facsimile receiver, and the like, and output devices including a printer, facsimile transmitter, and the like via a network, and provides a composite function by combining the functions of these independent function devices have been extensively developed and studied. Likewise, a multifunction product (MFP) that integrates the functions of the independent function devices in a single housing is required to extract its internal independent function and to combine it with the function of another device via a network so as to flexibly implement various composite functions.

As a programming model that allows to easily provide functions in information processing devices distributed in the network, remote procedure call (RPC) and distributed object techniques are prevalent. The distributed object technique corresponds to an object-oriented software model expanded to a distributed system, and allows an object on a given node to call an operation for an object on another network node (through the network) in the same procedure as a procedure in which an object on a given network node calls an operation for another object on the identical node.

In document processing including document input and output processes, flexible collaboration of a plurality of functions can be achieved by applying the distributed object technique. As proposals of a system based on the distributed object, which considers distributed processes other than information processes such as pure computations, JINI as an application of Java proposed by Sun Microsystems, and a common facility for a print process in CORBA proposed by Object Management Group (OMG) are known.

When various devices for document processes connected to the network can be controlled by the distributed object technique, a flexible client application which can freely combine various devices that provide objects based on a predetermined interface can be easily described.

By making an application execute the following operations, a client application that can dynamically cope with a change in control interface upon expansion of devices or the like can be easily described. First, the application dynamically inquires of a node which provides an object about an interface for operating that object. Second, the application dynamically acquires interface information of a stub which hides a communication with a server object which is located at a remote place and actually provides services. Third, the application dynamically downloads a proxy object.

However, in the prior art, the following problems are posed upon combining the functions of document processing devices on an operation environment of the client application.

More specifically, a case will be examined below wherein a client application that implements a required combined function by combining document processing devices which are connected via a network and have independent and composite functions is described, and especially, document input and output devices are combined. For example, an image scanner as the document input device and an image printer as the document output device are combined to realize a network-distributed copying machine. In such case, a client application calls a scan function of the image scanner to acquire image data of a document image. In general, the image data has a very large data size. The client application then calls a print function of the image printer, and proceeds with transfer of image data acquired by the scanner to the printer. In this way, when viewed from the client application, an application can be described using simple, integrated function calls regardless of the locations of objects and network nodes. Therefore, various document processing devices can be easily combined. However, the following problems are posed.

That is, since image data transfer processes from the scanner to the client application and then from the client application to the printer are executed, heavy communication traffic is produced on the network. The operation environment of the client application requires a large storage area, which occupies most of the storage capacity. Since these problems consume precious resources in large quantities, the cost problem is posed.

Especially, even when document image data is not used in practice like in a case wherein the printer goes to an error state after the beginning of document input from the scanner, image data is transferred from the scanner to the client application. For this reason, dead communication traffic increases on the network, and the storage area for the operation of the client application is wasted. Also, even when the scanner and printer as independent devices operate in combination, two transfer processes of image data from the scanner to the client application and from the client application to the printer are required, thus increasing dead communication traffic on the network and wasting the storage area for the operation of the client application.

SUMMARY OF THE INVENTION

The present invention has been made to solve the aforementioned problems, and has as its first object to provide a distributed processing system which includes devices that can be controlled by the distributed object technique, and is advantageous in terms of cost since it does not temporarily store image data upon operation of a client application to obviate the need for a large storage area as an operation environment of the client, and its control method.

It is the second object of the present invention to provide a distributed processing system which avoids data transfer processes from an input device to a client application and from the client application to an output device to reduce network traffic, and its control method.

It is the third object of the present invention to provide a distributed processing system which can reduce network traffic by decreasing the storage capacity required to operate a client application without using any network resources for document data transfer, when an object for a document input process and an object for a document output process provided by a single MFP are combined by the client application, and which can implement special control upon combining the input and output functions in the single MPF without impairing flexibility and expandability of combinations of distributed objects, since the client application and the document input and output objects make that control in the same procedure as that of normal distributed object control, and its control method.

In order to achieve the above objects, the present invention comprises the following arrangement.

A distributed processing system comprises:

a first device which saves a driver module that is executed by an external device to achieve a predetermined function; and a controller for acquiring the driver module from the first device, and transmitting the driver module to a second device that uses the first device, and the second device drives the first device by executing the driver module.

Preferably, the first device is a document input device, the second device is a document output device, and the first and second devices are connected to the controller via a network.

Preferably, the first device is a document output device, the second device is a document input device, and the first and second devices are connected to the controller via a network.

Preferably, the system further comprises a management unit for managing information which pertains to the driver module the first device saves, and the controller acquires the driver module from the first device by looking up the information managed by the management unit.

Preferably, when the first device is connected to the management unit, the first device sends information which pertains to the driver module the first device saves to the management unit.

According to another aspect of the present invention, a network device controlled by a control apparatus connected to a network, comprises:

a receiving unit for receiving a driver module, which makes another device connected to the network execute a predetermined function, from the control apparatus; and a communication unit for making the other device execute the function provided by the driver module, and transmitting/receiving data to/from the other device in association with the function under the control of the control apparatus.

According to still another aspect of the present invention, a driver server comprises:

a first storage unit for storing driver modules to be executed by a given device so as to allow the given device to use another device connected to a network; and a table for managing the driver modules stored in the first storage unit so as to be searchable by the given device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principles of the invention.

FIG. 10 shows an example of the user interface of the stub driver;

FIG. 18 shows the format of a management table in a driver server;

FIG. 19 is a diagram showing the method of registering drivers in the driver server by peripheral devices;

FIG. 20 shows the method of acquiring a driver from the driver server by a client computer; and FIG. 21 is an event trace chart (2) of a remote copy process.

DESCRIPTION OF THE PREFERRED EMBODIMENTS

[First Embodiment]

<System Configuration>

Figure 1:
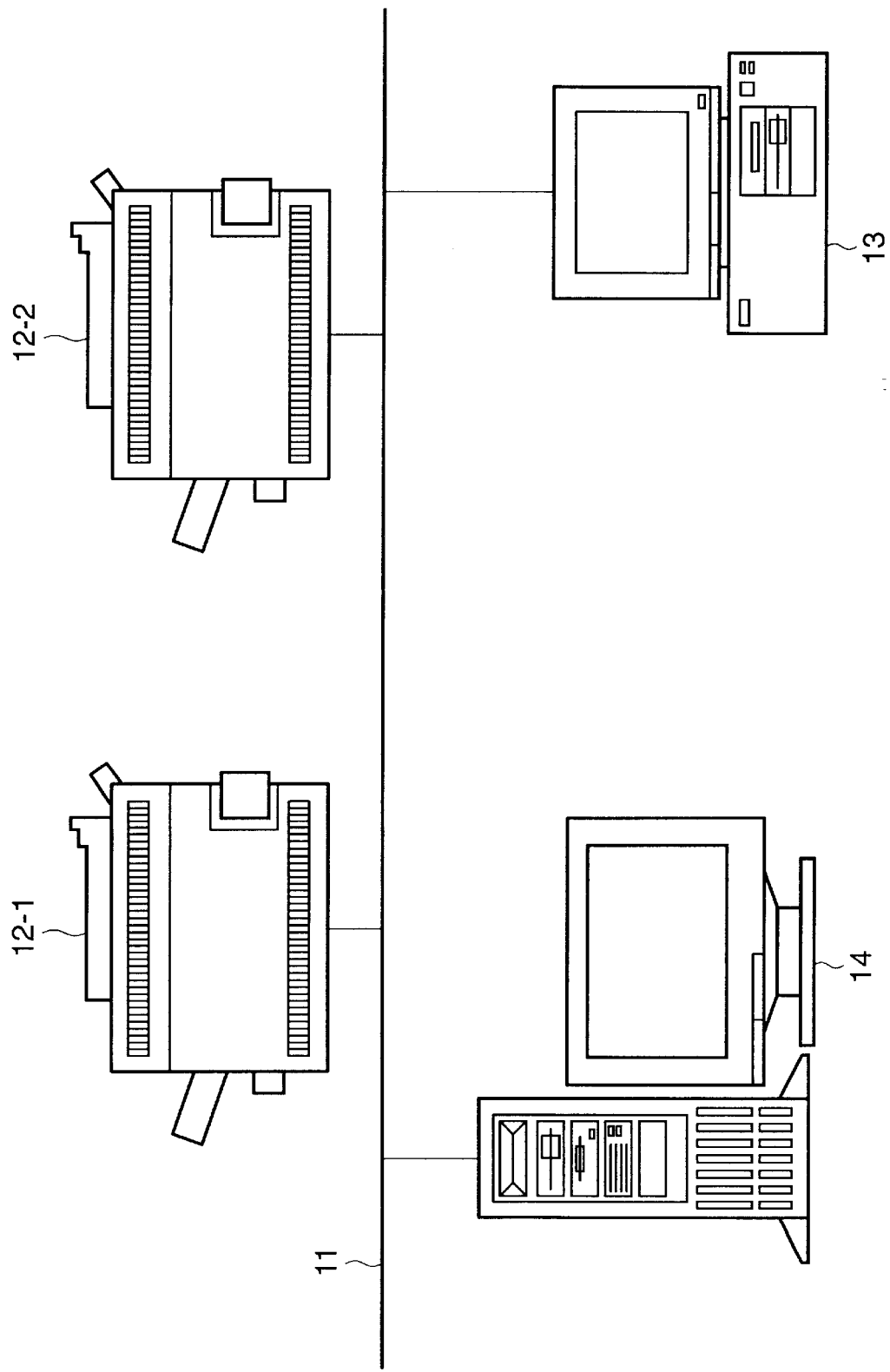
FIG. 1 is a diagram showing the arrangement of a network according to an embodiment of the present invention.

FIG. 1 shows a network system according to the first embodiment of the present invention. Referring to FIG. 1, two image input/output devices 12-1 and 12-2 which are compatible to a distributed object environment such as Java, CORBA, or the like, a client computer 13, and a service driver server computer 14 are connected to a network 11. The image input/output devices 12-1 and 12-2 include, e.g., a digital copying machine, a digital multi-function product (MFP) having a facsimile function in addition to the copy function, and the like. The image input/output devices 12-1 and 12-2 compatible to the distributed object environment (to be simply referred to as image input/output devices hereinafter) can transfer data via the network 11. Also, the client computer 13 can remote-control the image input/output devices 12-1 and 12-2. In the following description, the image input/output devices 12-1 and 12-2 will be generally referred to as image input/output devices 12.

The service driver server computer 14 is registered with service drivers required to remote-control the image input/output devices 12 from the client computer 13.

<Arrangement of Image Input/output Device>

Figure 2:
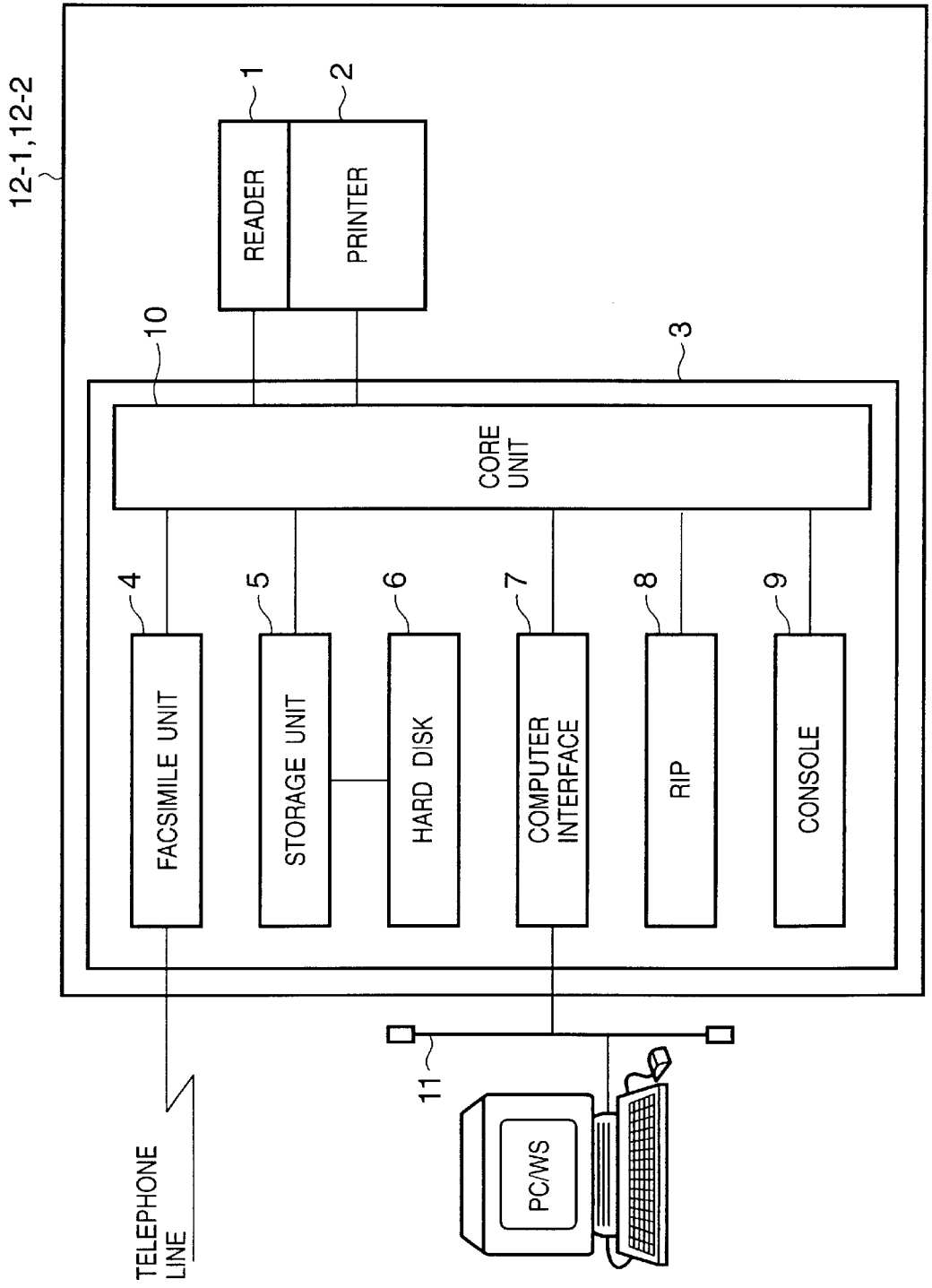
FIG. 2 is a block diagram showing an image input/output device according to the embodiment of the present invention.

FIG. 2 is a block diagram showing the arrangement of the image input/output devices 12-1 and 12-2 shown in FIG. 1.

Referring to FIG. 2, a reader 1 reads a document image, and outputs image data corresponding to the document image to an image input/output controller 3. A printer 2 prints an image corresponding to image data from the image input/output controller 3 on a print sheet. The image input/output controller 3 is connected to the reader 1 and printer 2, and comprises a facsimile unit 4, storage unit 5, computer interface 7, RIP (Raster Image Processor) 8, console 9, and core unit 10.

The facsimile unit 4 expands compressed image data received via a telephone line, and transfers expanded image data to the core unit 10. Also, the facsimile unit 4 compresses image data transferred from the core unit 10, and transmits the compressed image data via the telephone line. Image data to be transmitted/received can be temporarily saved in a hard disk 6 connected to the storage unit 5.

The hard disk 6 is connected to the storage unit 5, which compresses image data transferred from the core unit 10 and stores the compressed image data in the hard disk 6 together with an ID number used to search for that image data. The storage unit 5 searches the hard disk 6 for compressed image data on the basis of code data transferred via the core unit 10, reads out and expands the found compressed image data, and transfers the expanded image data to the core unit 10. The computer interface 7 is an interface between the network 11 and core unit 10, and exchanges data with the client computer 13 and another image input/output device 12.

The RIP 8 rasterizes code data (PDL) that expresses an image transferred from the network 11 to image data that the printer 2 can record.

The console 9 comprises a touch panel display and hard keys, and provides a user interface used to issue operation instructions, make operation setups, and so forth with respect to the image input/output devices 12.

The core unit 10 controls the data flow among the reader 1, printer 2, facsimile unit 4, storage unit 5, computer interface 7, RIP 8, and console 9, as will be described later.

Figure 3:
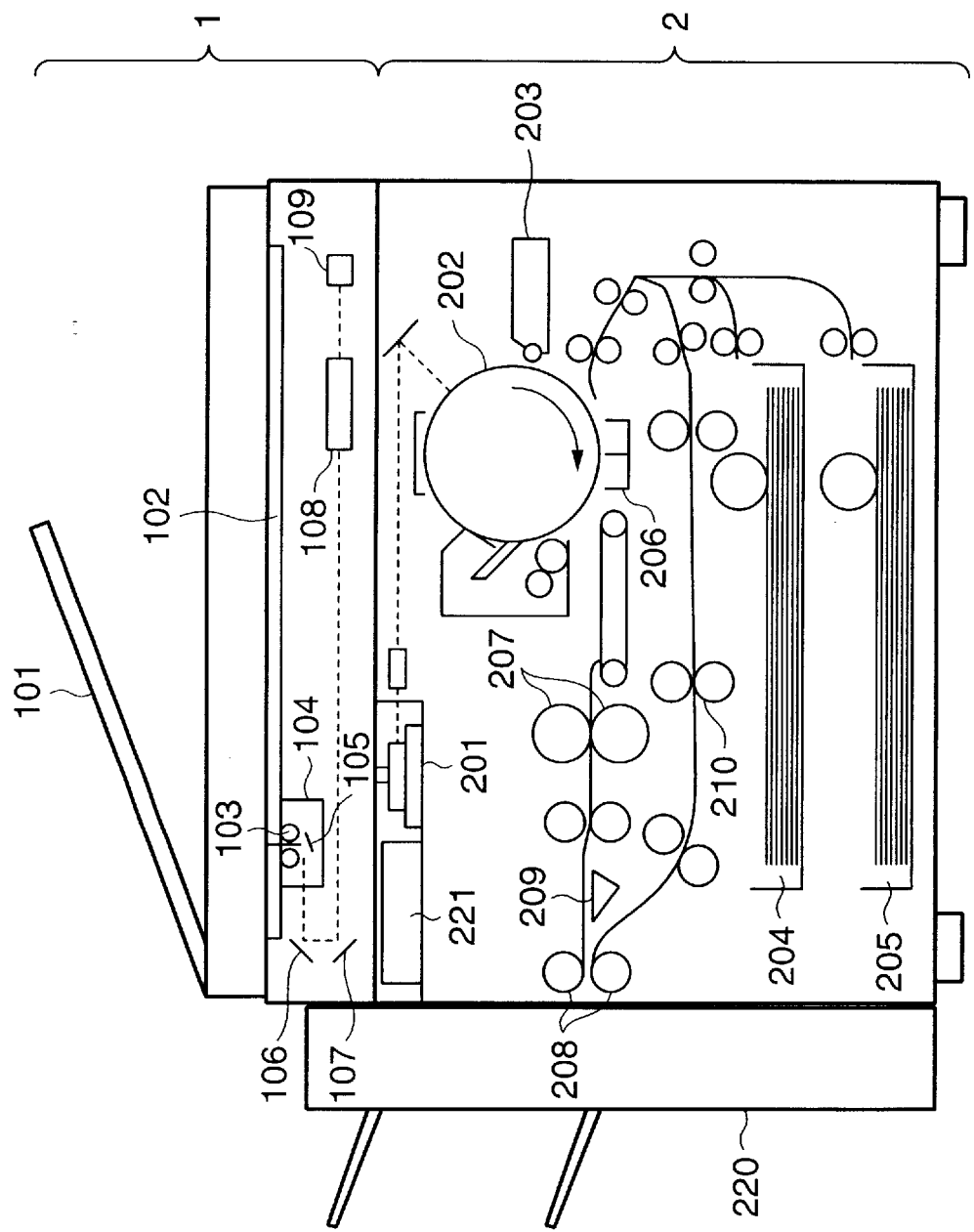
FIG. 3 is a sectional view of a reader and printer.

FIG. 3 is a sectional view of the reader 1 and printer 2. A document feeder 101 of the reader 1 feeds documents one by one in turn from the first page onto a platen glass 102, and exhausts the document on the platen glass 102 after the document image is read. When a document is fed onto the platen glass 102, a lamp 103 is turned on, and a scanner unit 104 begins to move, thus scanning the document by exposure. Light reflected by the document at that time is guided to a CCD image sensor (to be referred to as a CCD hereinafter) 109 via mirrors 105, 106, and 107 and a lens 108. The scanned document image is optically read by the CCD 109. Image data output from the CCD 109 undergoes a predetermined process, and the processed data is transferred to the core unit 10 of the image input/output controller 3.

A laser driver 221 of the printer 2 drives a laser emission unit 201 to emit a laser beam on the basis of image data output from the core unit 10 of the image input/output controller 3. This laser beam hits the surface of a photosensitive drum 202, and a latent image is formed on the surface of the photosensitive drum 202 based on the laser beam. The latent image formed on the photosensitive drum 202 is developed by a developing agent supplied from a developer 203. Simultaneously with the beginning of laser beam irradiation, a print sheet is fed from one of cassettes 204 and 205 and is conveyed to a transfer unit 206, and the developing agent image formed on the surface of the photosensitive drum 202 is transferred onto the print sheet. The print sheet that carries the developing agent image is conveyed to a fixing unit 207, and the developing agent image is fixed on the print sheet by heat and pressure applied by the fixing unit 207. The print sheet that has left the fixing unit 207 is exhausted by exhaust rollers 208. A finisher 220 binds and sorts exhausted print sheets, and staples the sorted print sheets. When a double-sided print mode is set, after the print sheet is conveyed to the position of the exhaust rollers 208, the rotational direction of the exhaust rollers 208 is reversed to guide the print sheet to a re-feed convey path 210 by a flapper 209.

Figure 4:
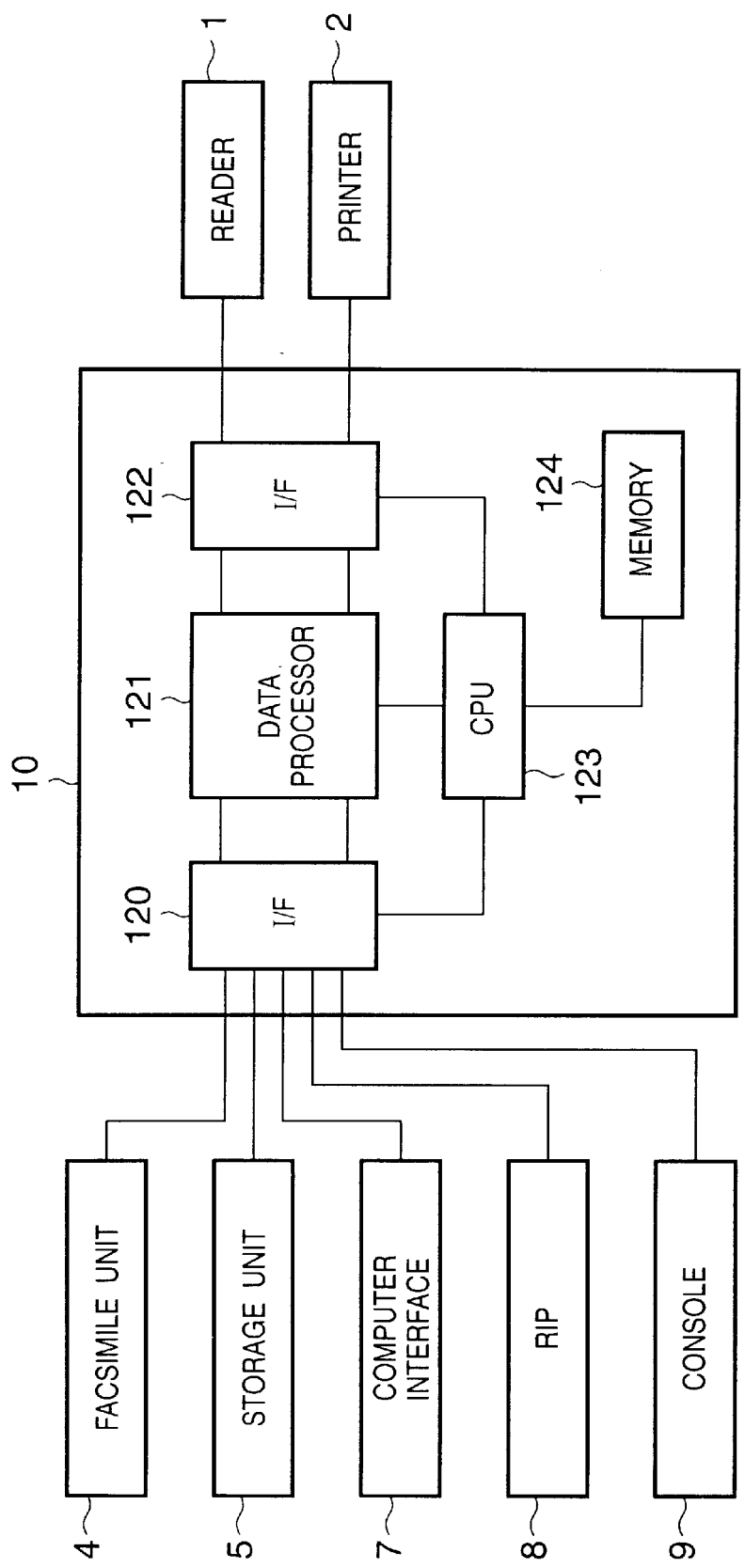
FIG. 4 is a block diagram of a core unit.

FIG. 4 is a block diagram of the core unit 10. Image data from the reader 1 is transferred to a data processor 121 via an interface 122. The data processor 121 executes image processes such as an image rotation process, zoom process, and the like of an image, and compresses/expands image data. The data processor 121 has an internal page memory for a plurality of pages of A4/Letter size image data. Image data transferred from the reader 1 to the data processor 121 is temporarily stored in the page memory, and is then compressed. The compressed image data is transferred to the storage unit 5 via an interface 120. Code data (PDL) which represents an image input via the computer interface 7 is transferred to the data processor 121 via the interface 120, and is then transferred to the RIP 8. The RIP 8 rasterizes the code data to image data, which is transferred to the data processor 121. The image data is temporarily stored in the page memory and is then transferred to the storage unit 5 after it is compressed.

Image data from the facsimile unit 4 is transferred to the data processor 121, and is temporarily stored in the page memory. The image data is compressed, and is then transferred to the storage unit 5. Image data from the storage unit 5 is transferred to the data processor 121, is then expanded, and is temporarily stored in the page memory. Then, the image data is transferred to the printer 2, facsimile unit 4, or computer interface 7. After various image data are input to the data processor 121 and are temporarily stored in the page memory, the image data may be transferred to the printer 2, facsimile unit 4, or computer interface 7 by switching an internal selector before the image data are transferred to the storage unit 5.

A CPU 123 makes the aforementioned control in accordance with a control program stored in a memory 124, and control commands transferred from the console 9. The memory 124 is also used as a work area of the CPU 123. In this way, processes that combine functions of reading a document image, printing an image, sending/receiving an image, saving an image, and exchanging data with a computer, and so on can be executed around the core unit 10 via the data processor 121 and storage unit 5.

<Job Control>

Figure 5:
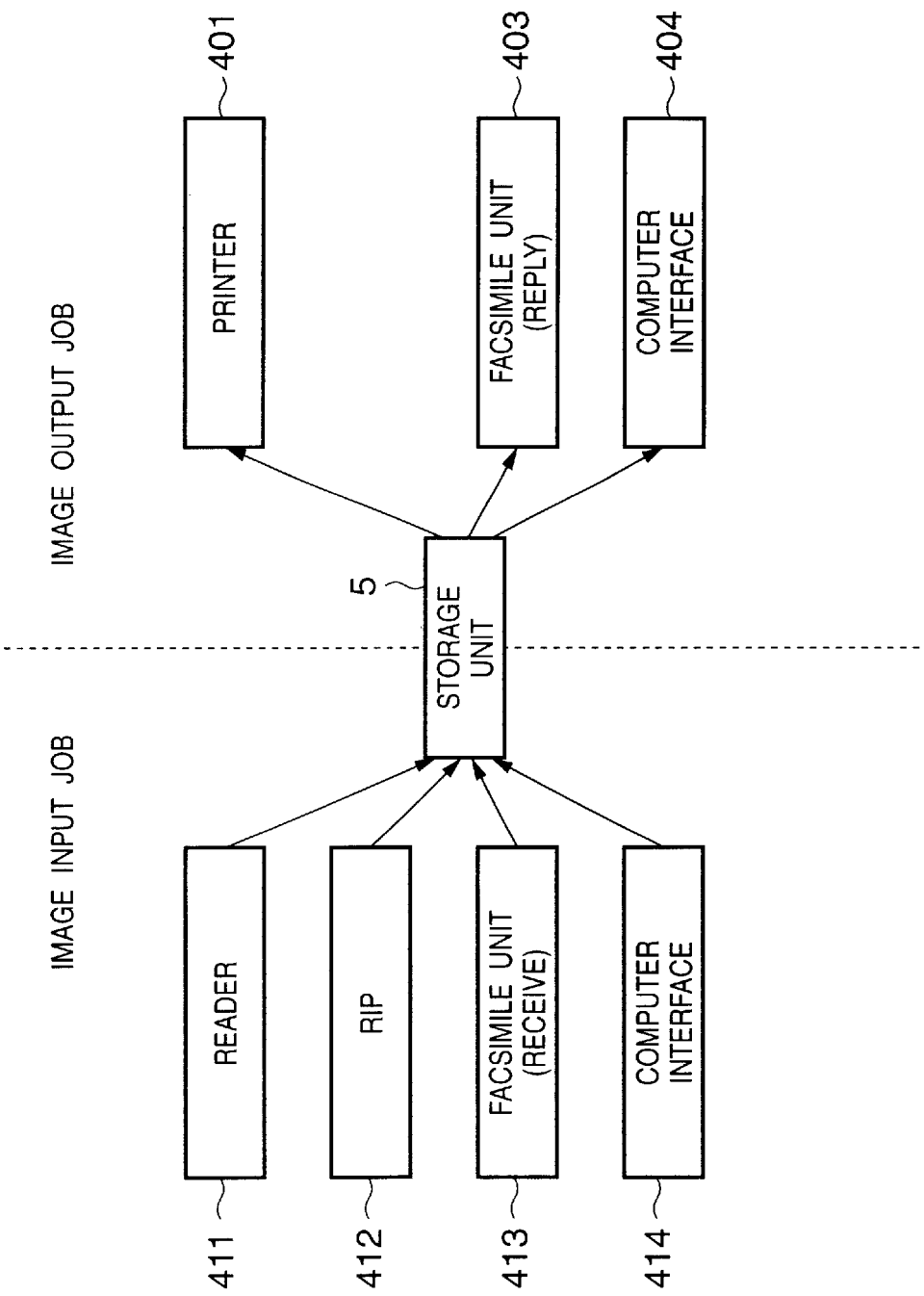
FIG. 5 is a block diagram of an image input job and image output job.

Job control in the image input/output device 12 according to this embodiment will be described below using FIG. 5. FIG. 5 logically illustrates job control units. Job control units are input and output processes for a set of image data containing a plurality of pages. Jobs to be controlled are roughly divided into image input jobs and image output jobs. The image input jobs are further categorized into an image input job 411 for sequentially recording image data read by the reader in the storage unit 5, an image input job 412 for sequentially recording image data rasterized by the RIP in the storage unit 5, an image input job 413 for sequentially recording image data received by the facsimile unit in the storage unit 5, and an image input job 414 for sequentially recording image data input from the computer interface in the storage unit 5. The image output jobs are further categorized into an image output job 401 for sequentially outputting image data read out from the storage unit 5 to the printer, an image output job 403 for sequentially outputting image data read out from the storage unit 5 to the facsimile unit, and an image output job 404 for sequentially outputting image data read out from the storage unit 5 to the computer interface.

Figure 6:
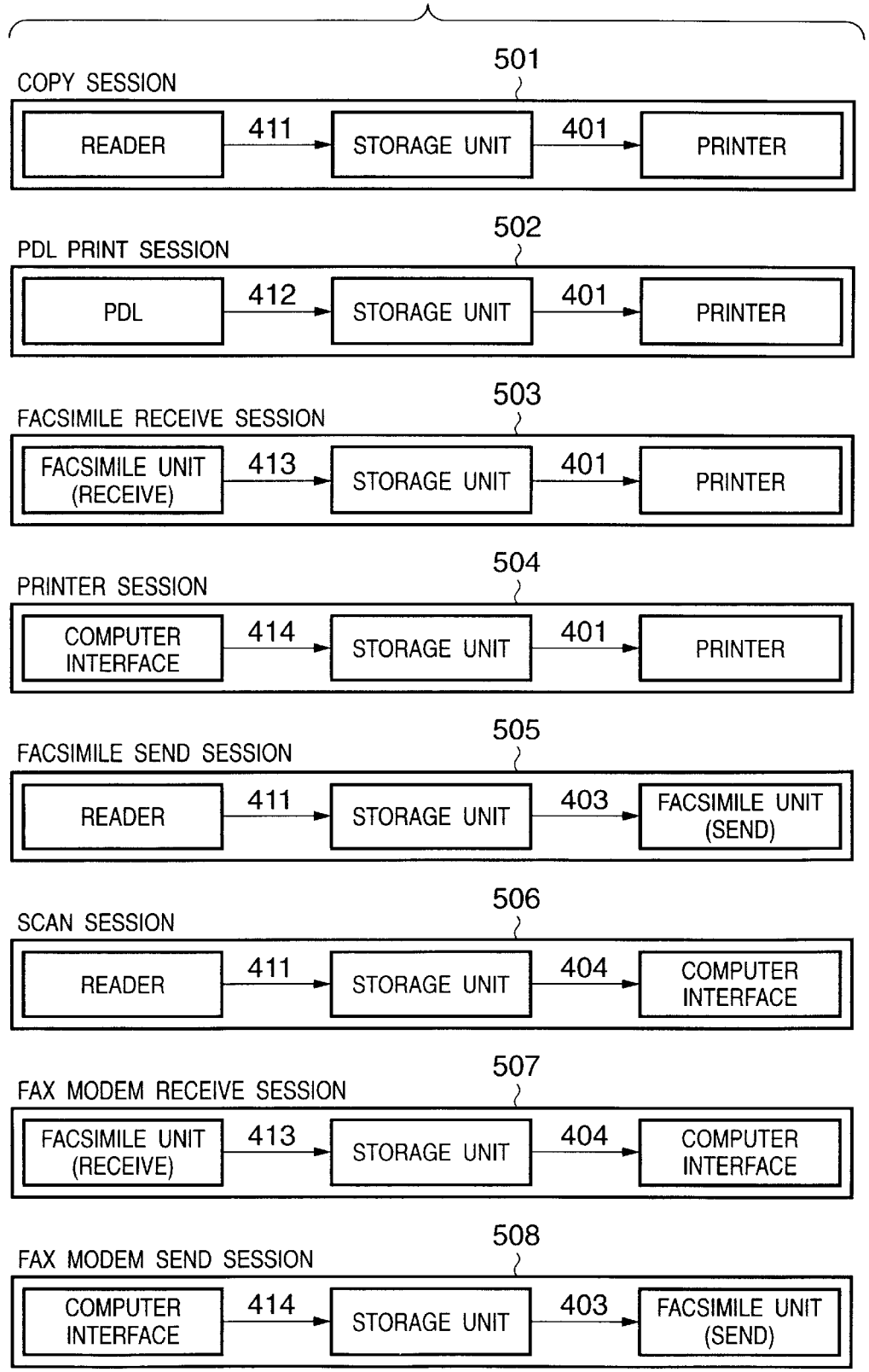
FIG. 6 shows examples of the configurations of sessions.

FIG. 6 shows examples of units (to be referred to as sessions hereinafter) obtained by combining a plurality of jobs. A copy session 501 is controlled as a session that combines the image input job 411 and image output job 401.

A PDL print session 502 is controlled as a session that combines the image input job 412 and image output job 401. A facsimile receive session 503 is controlled as a session that combines the image input job 413 and image output job 401. A printer session 504 is controlled as a session that combines the image input job 414 and image output job 401. A facsimile send session 505 is controlled as a session that combines the image input job 411 and image output job 403. A scan session 506 is controlled as a session that combines the image input job 411 and image output job 404. A FAX modem receive session 507 is controlled as a session that combines the image input job 413 and image output job 404. A FAX modem send session 508 is controlled as a session that combines the image input job 414 and image output job 403.

Note that each session is a control unit that includes at least one job. For example, the image input job 412 may be handled as one session, the image output job 401 may be handled as one session, and a combination of the image input job 412 and image output jobs 401 and 402 may be handled as one session.

<Computer Interface>

Figure 7:
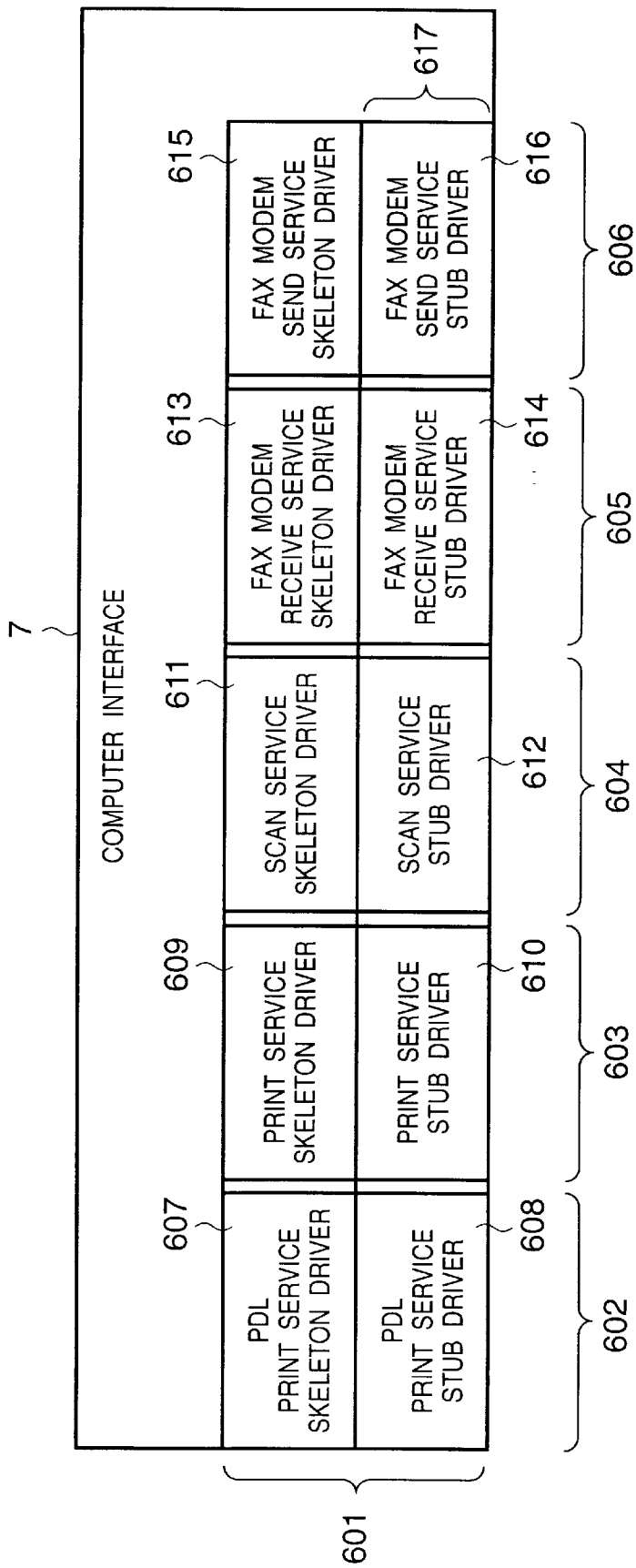
FIG. 7 is a diagram showing the arrangement of a computer interface.

FIG. 7 is a block diagram of the computer interface 7. In the computer interface 7, a group 601 of service drivers corresponding to the respective sessions are registered. Note that sessions corresponding to the group 601 of service drivers are those including the image input job 414 or image output job 404, which uses the computer interface 7 as a data transfer path. Exceptionally, the image input job 412 from the RIP 8 includes the computer interface 7 as a transfer path of PDL data to the RIP 8. For this reason, service drivers corresponding to sessions that include the image input job 412 are also registered. That is, of the sessions shown in FIG. 6, the PDL print session 502, printer session 504, scan session 506, FAX modem receive session 507, and FAX modem send session 508 are those which may use the computer interface 7 as a transfer path. In the computer interface 7, a PDL print service driver 602, printer service driver 603, scan service driver 604, FAX modem receive service driver 605, and FAX modem send service driver 606 corresponding to those sessions are registered. Each service driver is divided into a skeleton service driver and stub service driver. For example, the PDL print service driver 602 is divided into a PDL print service skeleton driver 607 and PDL print service stub driver 608. Likewise, the printer service driver 603 is divided into a printer service skeleton driver 609 and printer service stub driver 610; the scan service driver 604 into a scan service skeleton driver 611 and scan service stub driver 612; the FAX modem receive service driver 605 into a FAX modem receive service skeleton driver 613 and FAX modem receive service stub driver 614; and the FAX modem send service driver 606 into a FAX modem send service skeleton driver 615 and FAX modem send service stub driver 616. Each driver is formed by a set of skeleton driver and stub driver.

Figure 11:
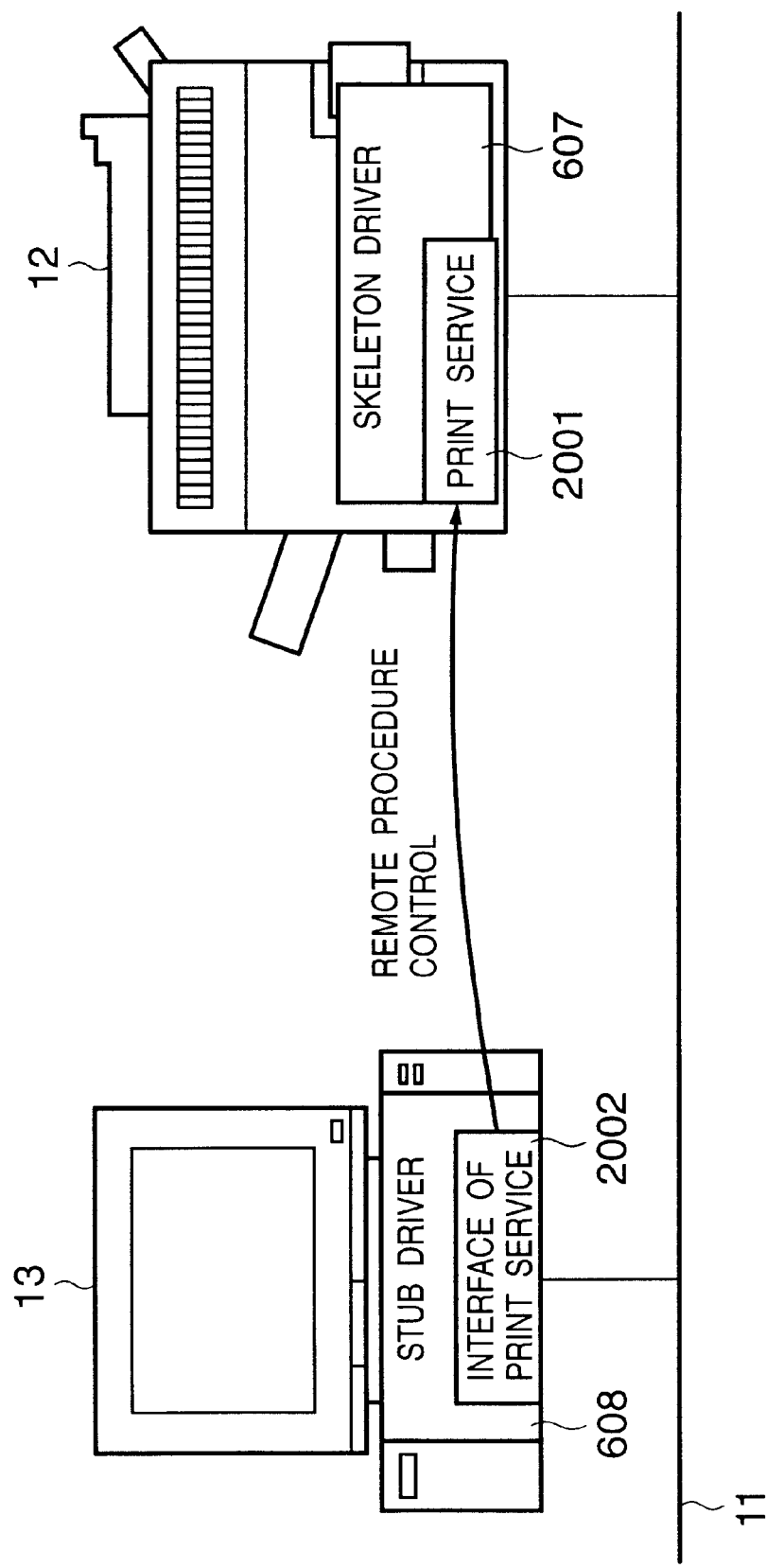
FIG. 11 shows the relationship between a skeleton driver and the stub driver.

The relationship between the skeleton driver and stub driver will be explained below using FIG. 11. The relationship between these skeleton and stub drivers has already been utilized in various situations as the state-of-the-art technique, i.e., as a remote procedure call of the distributed object environment. For example, RMI of Java language, ORB of CORBA, and the like are known. The following explanation will be given taking the PDL print service skeleton driver 607 and PDL print service stub driver 608 as an example. The PDL print service skeleton driver 607 is a software component which resides in the image input/output device 12 which provides that service and is compatible to the distributed object environment. By contrast, the PDL print service stub driver 608 is called from a device (client computer 13 in this case) that wants to use the service and is executed.

When the PDL print service skeleton driver 607 has a "print" service 2001, the PDL print service stub driver 608 has an interface 2002 for calling that service.

The client computer 13, which wants to use the "print" service of the image input/output device 12, can print at the image input/output device 12 with the PDL print service skeleton driver 607 by calling the interface 2002 of the PDL print service stub driver 608. Note that PDL print is a service for inputting data described in a page description language (PDL) to an output device, which rasterizes that data to image data and outputs an image.

In the above arrangement, the image input/output devices and the like as network nodes are recognized as objects by a client application which runs on the client computer, and when the client application calls a method for executing a desired function of each object, the stub and skeleton drivers which execute the function corresponding to the method are executed, thus implementing the function. That is, the method called by the application is a function execution command corresponding to the method on the driver level. For this reason, they are not particularly distinguished in the following description.

<Remote Print Procedure>

Figure 8:
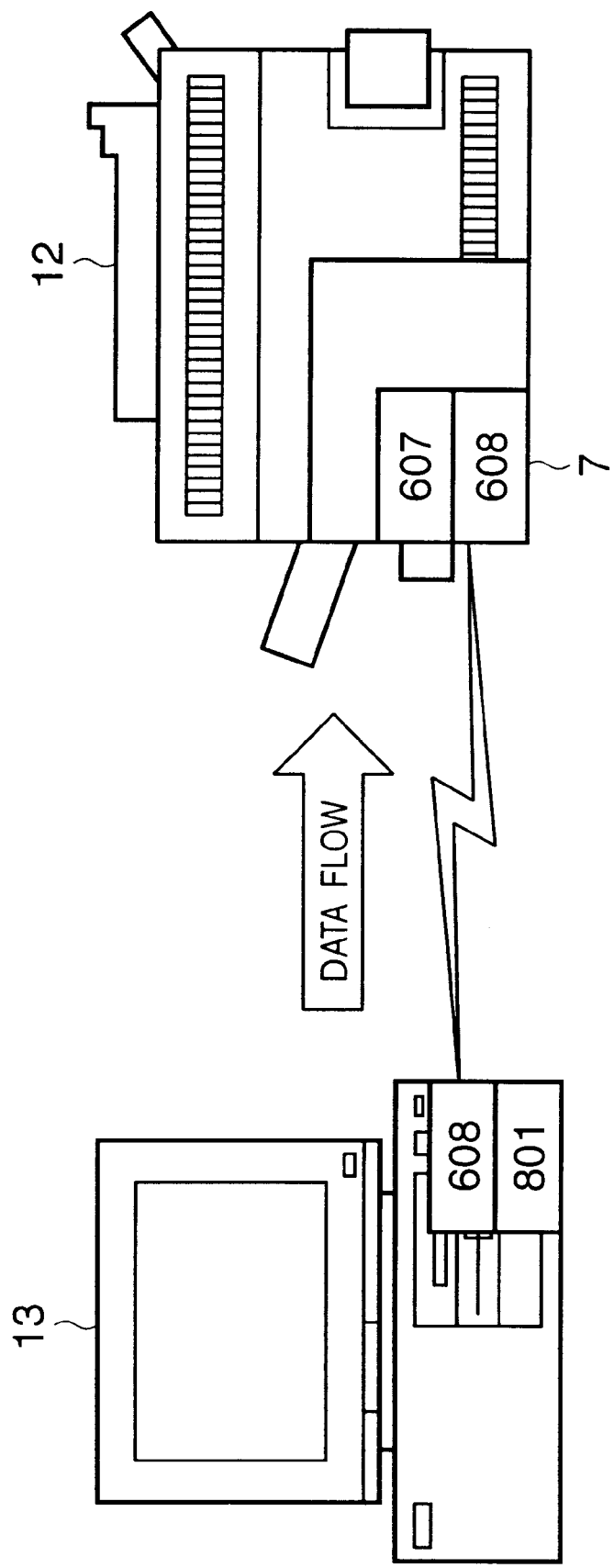
FIG. 8 shows the arrangement of a network of the first embodiment.

A procedure for executing a PDL print process from the client computer 13 to the image input/output device 12 according to this embodiment will be described below using FIG. 8. Upon executing a PDL print process from the client computer 13 to the image input/output device 12, the client computer 13 must download from the image input/output device 12 the PDL print service stub driver 608 of the group 601 of service drivers registered in the computer interface 7. The client computer 13 comprises a virtual machine 801. The PDL print service stub driver 608 is described in an intermediate language (e.g., Java language) that runs on the virtual machine 801, and can run independently of the types of CPU and operating system of the client computer 13.

Figure 9:
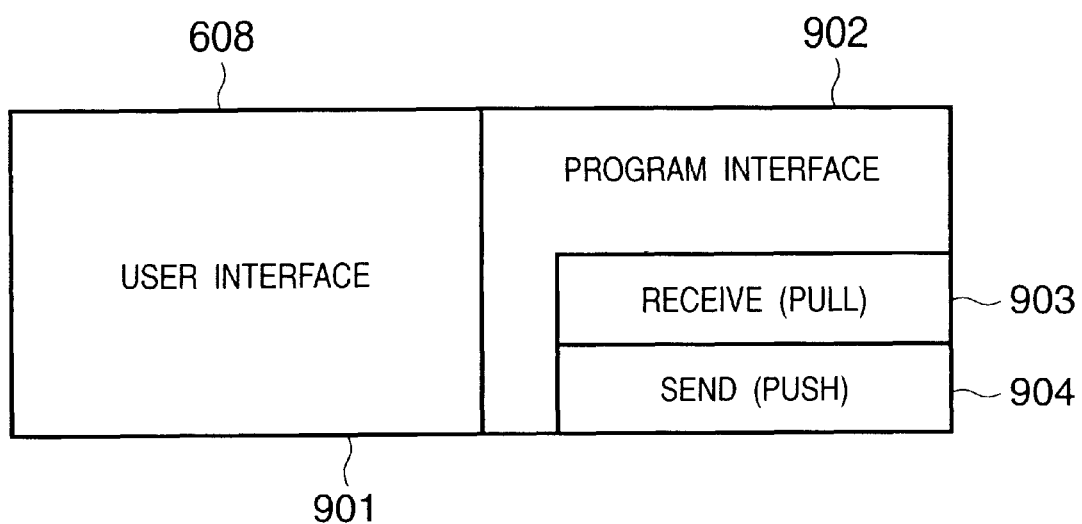
FIG. 9 shows the format of a stub driver.

The structure of the PDL print service stub driver 608 can be divided into two interfaces, i.e., a user interface 901 and program interface 902, as shown in FIG. 9. The user interface 901 is a program that covers interactive part with a service such as the way the user wants to use the PDL print service (e.g., the output sheet size, the number of copies, and the like). FIG. 10 shows an example of the user interface 901.

The program interface 902 is an interface of a remote procedure call with the PDL print service skeleton driver 607. Upon calling the program interface, the corresponding interface of the PDL print service skeleton driver 607 is called. The program interface 902 requires at least two interfaces, i.e., receive (pull) 903 and send (push) 904.

The procedure for executing the PDL print process from the client computer 13 to the image input/output device 12 will be described below using the event trace chart shown in FIG. 12.

In step (S1201), the client computer 13 requests the PDL print service stub driver 608 of the image input/output device 12 to execute the PDL print process using the image input/output device 12.

In step (S1202), the image input/output device 12 passes the PDL print service stub driver 608 to the client computer 13 in response to the request (S1201) from the client computer 13.

In step (S1203), the client computer 13 calls a print command of the image input/output device 12. In step (S1204), actual document data is transferred from the client computer 13 to the image input/output device 12, which prints out the document.

<Remote Scan Procedure>

Figure 13:
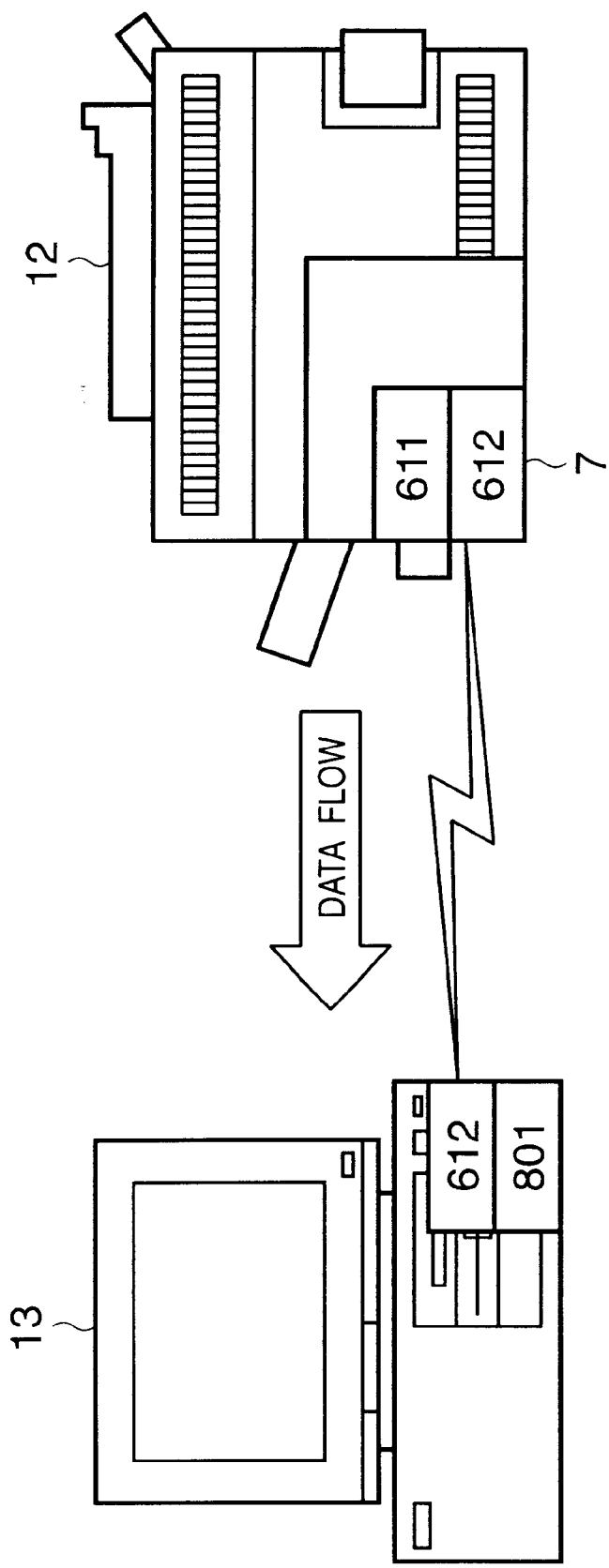
FIG. 13 shows the arrangement of a network.

A case will be explained below wherein the client computer 13 captures image data using a scan service of the image input/output device 12, as shown in FIG. 13. In order to use the scan service of the image input/output device 12, the client computer 13 downloads the scan service stub driver 612 from the image input/output device 12. An actual operation flow will be explained using FIG. 14.

In step (S1401), the client computer 13 requests the scan service stub driver 612 of the image input/output device 12 to execute the scan process using the image input/output device 12.

In step (S1402), the image input/output device 12 passes the scan service stub driver 612 to the client computer 13 in response to the request (S1401) form the client computer 13.

In step (S1403), the client computer 13 calls a scan command of the image input/output device 12.

In step (S1404), the image input/output device 12 transfers scanned actual data to the client in response to the request (S1403) from the client computer 13.

<Remote Copy Procedure (1)>

A remote copy procedure for scanning a document image using the image input/output device 12-1, and printing the scanned image using the image input/output device 12-2 in the arrangement shown in FIG. 15 will be described below.

Figure 15:
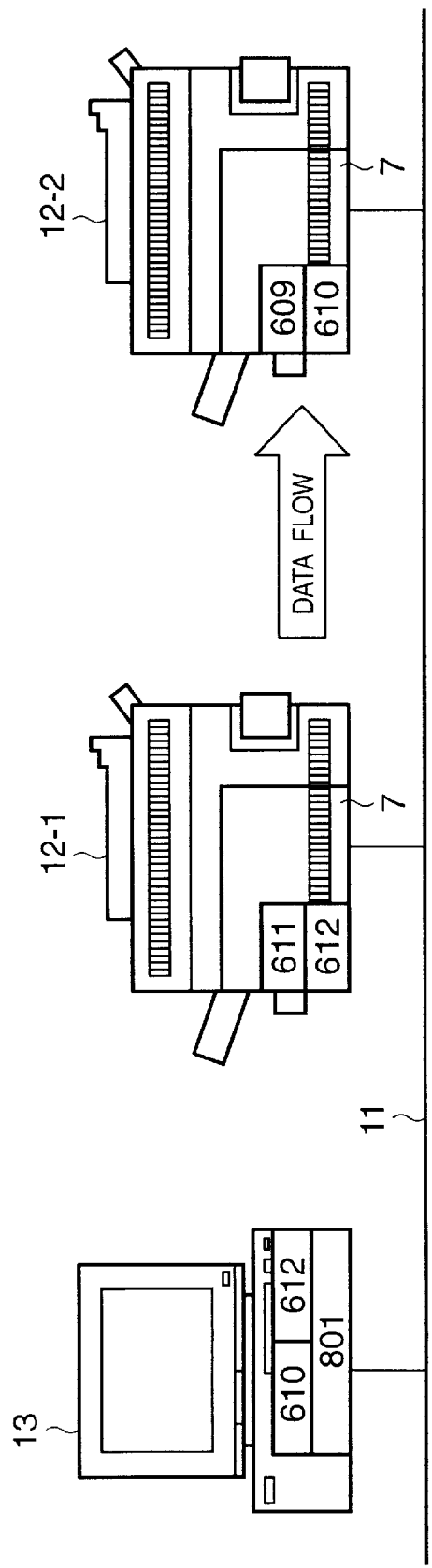
FIG. 15 shows a network.

As shown in FIG. 15, the two image input/output devices (image input/output devices 12-1 and 12-2) and the client computer 13 are connected to the network 11. The client computer 13 executes remote copy from the image input/output device 12-1 to the image input/output device 12-2 using a scan service of the image input/output device 12-1, and a print service of the image input/output device 12-2. In order to use the scan service of the image input/output device 12-1, the client computer 13 downloads the scan service stub driver 612 from the image input/output device 12-1. In order to use the print service of the image input/output device 12-2, the client computer 13 downloads the print service stub driver 610 from the image input/output device 12-2. An actual operation flow will be explained below using FIG. 16.

In step (S1601), the client computer 13 requests the scan service stub driver 612 of the image input/output device 12-1 to scan an image using the image input/output device 12-1.

In step (S1602), the image input/output device 12-1 passes the scan service stub driver 612 to the client computer 13 in response to the request (S1601) from the client computer 13.

In step (S1603), the client computer 13 requests the print service stub driver 610 of the image input/output device 12-2 to print an image using the image input/output device 12-2.

In step (S1604), the image input/output device 12-2 passes the print service stub driver 610 to the client computer 13 in response to the request (S1603) from the client computer 13.

In step (S1605), the client computer 13 passes the print service stub driver 610 of the image input/output device 12-2 as a write destination to the image input/output device 12-1.

In step (S1606), the image input/output device 12-1 launches its own scan method to scan document data, and then calls a write method of the image input/output device 12-2. That is, the image input/output device 12-1 calls a print command of the image input/output device 12-2. The scan method may be launched by the image input/output device 12-1 in response to reception of the stub driver 610 from the client computer 13 as a trigger or by calling a method therefor by the client computer 13.

In step (S1607), the image input/output device 12-1 transfers actual data to the image input/output device 12-2. This data is printed out by the image input/output device 12-2.

<Remote Copy Procedure (2)>

As another remote copy procedure, the following example will be explained. In this example as well, the image input/output device 12-1 scans a document image, and the image input/output device 12-2 prints it out in the arrangement shown in FIG. 15. An actual operation flow will be explained below using FIG. 21.

In step (S2101), the client computer 13 requests the scan service stub driver 612 of the image input/output device 12-1 to scan an image using the image input/output device 12-1.

In step (S2102), the image input/output device 12-1 passes the scan service stub driver 612 to the client computer 13 in response to the request (S2101) from the client computer 13.

In step (S2103), the client computer 13 requests the print service stub driver 610 of the image input/output device 12-2 to print an image using the image input/output device 12-2.

In step (S2104), the image input/output device 12-2 passes the print service stub driver 610 to the client computer 13 in response to the request (S2103) from the client computer 13.

In step (S2105), the client computer 13 passes the scan service stub driver 612 of the image input/output device 12-1 as a scan source to the image input/output device 12-2.

In step (S2106), the image input/output device 12-2 launches its own print method, which calls a scan method of the image input/output device 12-1.

In step (S2107), the image input/output device 12-1 scans a document in response to the call request (S2106) of the scan method from the image input/output device 12-2, and transfers actual data of the scanned document.

The image input/output device 12-2 prints out the data received from the image input/output device 12-1.

As described above, one of devices for reading/writing document data has a stub driver of a partner device in place of an intermediary host computer, and the stub driver controls the partner device to read/write data. With this arrangement, the intermediary host computer is set free from transmission/reception of document data, and resource consumption can be saved. Hence, processes executed by the host computer can be prevented from retarding or being disabled due to the intermediary load.

Especially, when the client application combines an object for a document input process and an object for a document output process, which are provided by a single MFP, network resources for document data transfer need not be used at all. This process can be achieved without impairing flexibility and expandability of combinations of distributed objects since it is visible from the client application and the document input and output objects.

[Second Embodiment]

Figure 12:
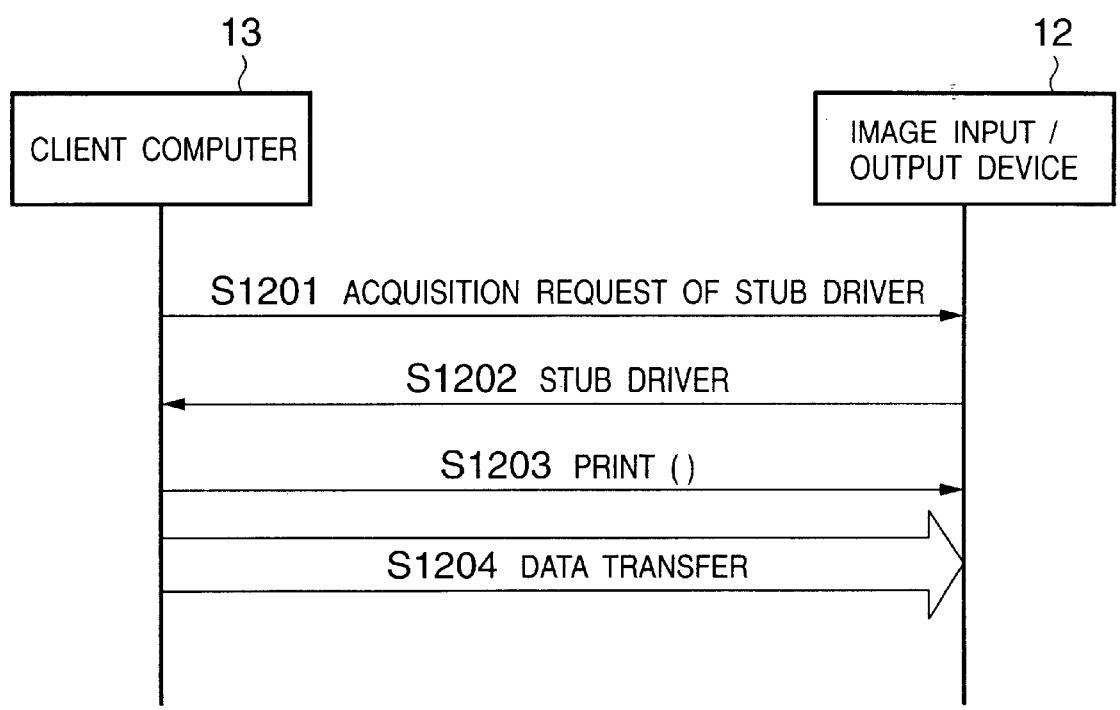
FIG. 12 is an event trace chart of a remote print process.
Figure 14:
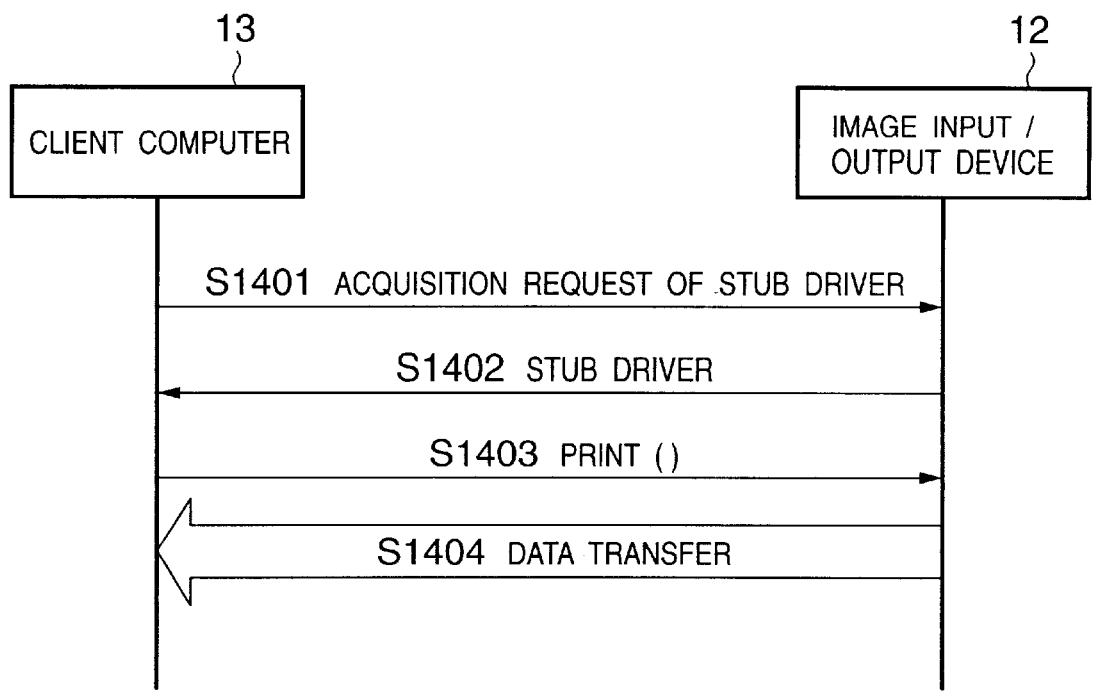
FIG. 14 is an event trace chart of a remote scan process.
Figure 16:
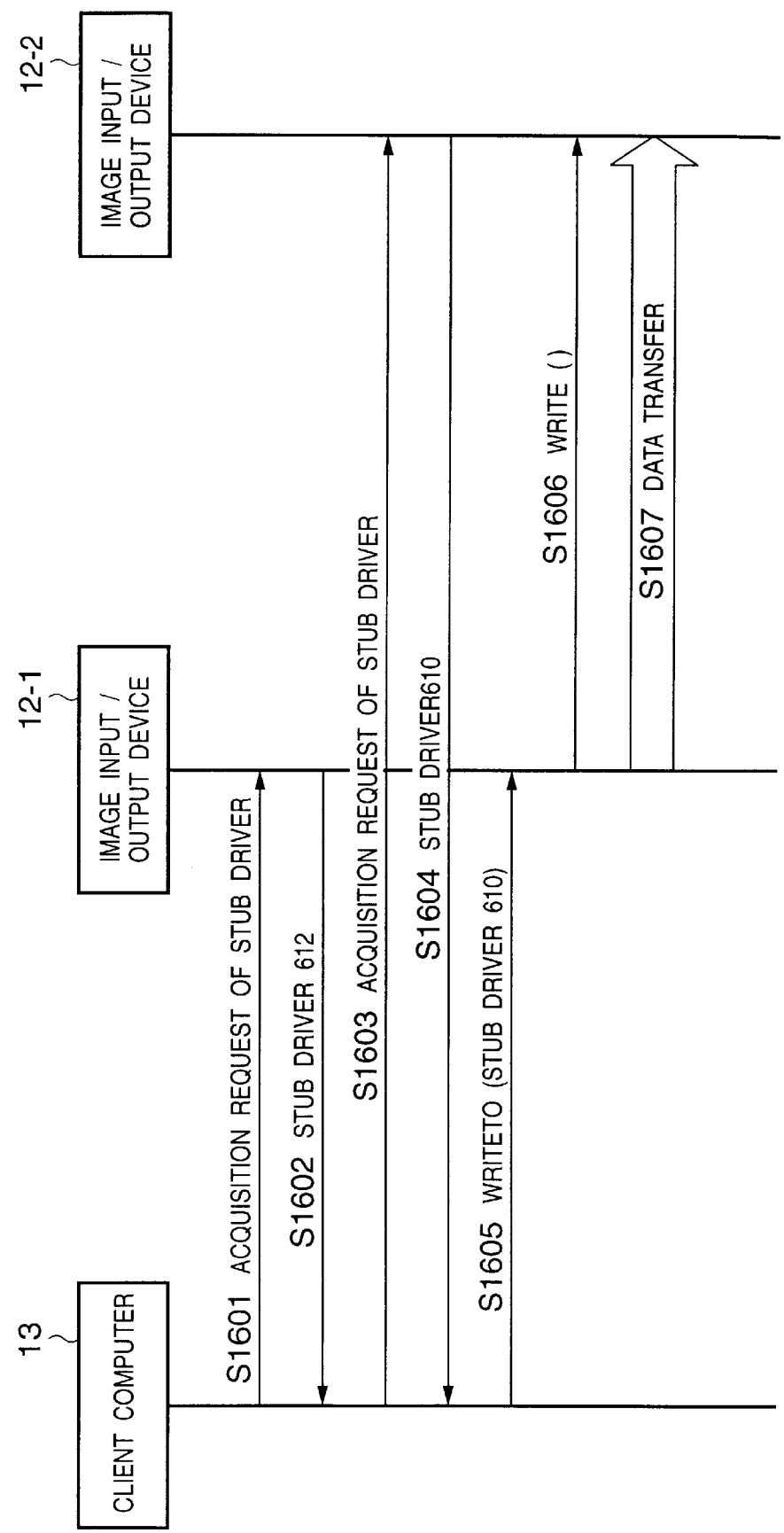
FIG. 16 is an event trace chart (1) of a remote copy process.

In step S1201 in FIG. 12, step S1401 in FIG. 14, steps S1601 and S1603 in FIG. 16, or steps S2101 and S2103 in FIG. 21, the client computer 13 downloads a stub driver from the corresponding image input/output device 12 to user a scan service, PDL print service, and print service of the image input/output device 12. However, in the method of the first embodiment, the user who uses the client computer 13 must recognize beforehand the presence of image input/output devices 12 compatible to the distributed object environment on the network 11.

Figure 17:
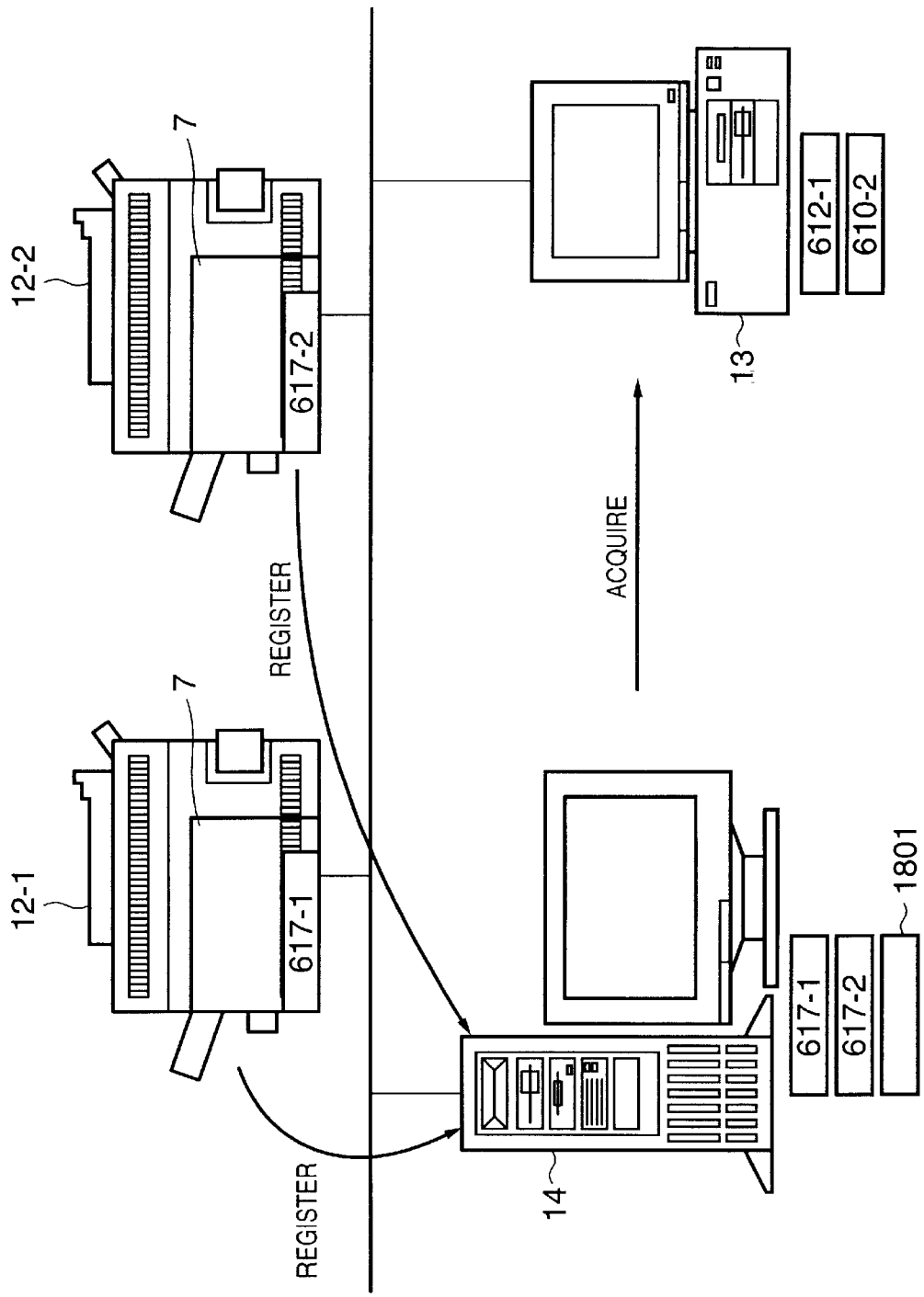
FIG. 17 shows an acquisition method of a stub driver in an image input/output device.

A mechanism that allows to download a stub driver corresponding to a service of a peripheral device that the user wants to use even when the user who uses the client computer 13 does not recognize the configuration of the network 11 will be explained below using FIG. 17. Unlike the arrangement shown in FIG. 15, a driver server 14 is present on the network. Image input/output devices 12-1 and 12-2 which are connected to the network and are compatible to distributed object environment register groups 617-1 and 617-2 of stub drivers in the driver server 14.

In the driver server 14, the registered stub drivers are managed by a stub driver management table 1801 shown in FIG. 18 using the registration dates, service contents, and peripheral device names. Upon receiving a request "want to use a print service" or "want to use a scan service" from an application program, the client computer 13 looks up the management table 1801 of the driver server 14 to confirm registered services, and downloads a driver corresponding to the requested service from the driver server 14.

FIG. 19 illustrates a process until peripheral devices upload stub drivers in the driver server 14, and FIG. 20 illustrates a process until the client computer 13 downloads a driver from the driver server 14.

In FIG. 19, at the instance when the image input/output device 12 is connected to the network 11, it casts a broadcast packet that asks the presence of the driver server 14 onto the network 11 (1). Upon receiving the packet, the driver server 14 informs the image input/output device 12 of the presence of the driver server 14 (2). After that, the image input/output device 12 uploads stub drivers 617 to the found driver server 14, which registers these drivers in the management table 1801 (3). In this manner, the management table 1801 is created and stored in the driver server 14.

When devices included in a peripheral device are disconnected from the network 11, the server 13 is informed of drivers which no longer function due to disconnection of the devices. Upon receiving such information, the server 14 updates the management table 1801. When the peripheral device itself is disconnected from the network, it is determined that the peripheral device is disconnected from the network since data which periodically flows on the network cannot be received, and the server 14 registers the stub drivers of the devices included in that peripheral device as disabled ones on the management table 1801.

In FIG. 20, when the client computer 13 uses the image input/output device 12, it searches the driver server 14 to find what kinds of services of drivers are available (1). The client computer 13 downloads drivers, which may be required, from the driver server (2), and communicates with the image input/output device 12 that provides a required service (3). The sequence of step (3) is the same as the operation of the client computer 3 after the stub driver has been downloaded in FIG. 12, 14, 16, or 21.

In these steps (1) and (2), the client may download and search contents of the server 14, and may request a required driver program of the server 14. Alternatively, the client may send an identifier (peripheral device name) and required service contents of a required device to the server 14, which may search the management table 18 for a stub driver that matches the input condition and may send it to the client.

In the procedures shown in FIGS. 19 and 20, step (1) is executed by the client computer 13, step (2) by the driver server 14, and step (3) by the image input/output device 12. A subject of this process is a processor which controls each whole device, and the procedures shown in FIGS. 19 and 20 are implemented by executing programs corresponding to the sequences of steps (1) to (3) by the processors.

In this manner, since stub drivers of devices connected to the network are simultaneously managed by the management table of the driver server, available stub drivers can be detected by looking up the management table, and even when the user has no knowledge about network resources except for the driver server 14, he or she can use the network resources.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium (or recording medium), which records a program code of software that can implement the functions of the above-mentioned embodiments, and is used to execute the procedure shown in FIG. 16 or 21 in each device, to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

As described above, according to the present invention, since image data is not temporarily stored between an image input device and output device, the need for a storage area, data transfer, and storage process therefor can be obviated, system resources can be saved, and efficient processes can be done with fewer resources.

According to the present invention, the number of times of image data transfer is reduced to reduce network traffic.

Since functions of devices are simultaneously managed, the user can use these devices without any knowledge about the system.

As many apparently widely different embodiments of the present invention can be made without departing from the spirit and scope thereof, it is to be understood that the invention is not limited to the specific embodiments thereof except as defined in the appended claims.

What is claimed is:

1. A distributed processing system comprising:
   a first device, which saves a driver module that is executed by an external device to achieve a predetermined function; and
   a controller for acquiring the driver module from said first device and transmitting the driver module to a second device that uses said first device,
   wherein said second device drives said first device by executing the driver module.

2. The system according to claim 1, wherein said first device is an input device, said second device is an output device, and said second device drives said first device to scan an image and inputs image data by executing the driver module.

3. The system according to claim 1, wherein said first device is an output device, said second device is an input device, and said second device transfers print data to said first device by executing the driver module.

4. The system according to claim 1, further comprising a management unit for managing information that pertains to the driver module saved by said first device, wherein said controller acquires the driver module from said first device by looking up the information managed by said management unit.

5. The system according to claim 4, wherein, when said first device is connected to said management unit, said first device sends information pertaining to the driver module saved by said first device to said management unit.

6. A distributed processing method comprising:
an acquisition step of acquiring a driver module from a first device, which saves the driver module, wherein the driver module is executed by an external device to achieve a predetermined function; and
a transmission step of transmitting the driver module to a second device that uses the first device,
wherein the second device drives the first device by executing the driver module.

7. The method according to claim 6, wherein the first device is an input device, the second device is an output device, and the first and second devices are connected to a controller via a network.

8. The method according to claim 6, wherein the first device is an output device, the second device is an input device, and the first and second devices are connected to a controller via a network.

9. The method according to claim 6, wherein said acquisition step includes acquiring the driver module from the first device by looking up information managed by a management unit for managing information pertaining to the driver module saved by the first device.

10. The method according to claim 9, further comprising the step of transmitting, when the first device is connected to the management unit, information that pertains to the driver module saved by the first device to the management unit.

11. A network device control apparatus for controlling devices connected to a network, comprising:
an acquisition unit for acquiring a driver module from a first device, which saves the driver module, wherein the driver module is executed by an external device to achieve a predetermined function; and
a controller for transmitting the driver module to a second device that uses the first device,
wherein the second device drives the first device by executing the driver module.

12. The apparatus according to claim 11, wherein the first device is an input device, and the second device is an output device.

13. The apparatus according to claim 11, wherein the first device is an output device, and the second device is an input device.

14. The apparatus according to claim 11, further comprising a management unit for managing information pertaining to the driver module saved by the first device, wherein said acquisition unit acquires the driver module from the first device by looking up the information managed by said management unit.

15. The apparatus according to claim 14, wherein, when the first device is connected to said management unit, said management unit receives information pertaining to the driver module saved by the first device.

16. A network device control method for controlling devices connected to a network, comprising:
an acquisition step of acquiring a driver module from a first device, which saves the driver module, wherein the driver module is executed by an external device to achieve a predetermined function; and
a transmission step of transmitting the driver module to a second device that uses the first device,
wherein the second device drives the first device by executing the driver module.

17. The method according to claim 16, wherein the first device is an input device, and the second device is an output device.

18. The method according to claim 16, wherein the first device is an output device, and the second device is an input device.

19. The method according to claim 16, wherein the acquisition unit acquires the driver module from the first device by looking up information managed by a management unit for managing information pertaining to the driver module saved by the first device.

20. The method according to claim 19, further comprising a reception step of receiving, when the first device is connected to the management unit, information that pertains to the driver module saved by the first device.

21. A program storage medium storing a network device control program for implementing a method of controlling devices connected to a network, wherein the method comprises:
an acquisition step of acquiring a driver module from a first device, which saves the driver module, wherein the driver module is executed by an external device to achieve a predetermined function; and
a transmission step of transmitting the driver module to a second device that uses the first device,
wherein the second device drives the first device executing the driver module.

22. A network device controlled by a control apparatus connected to a network, comprising:
a receiving unit for receiving a driver module, which makes another device connected to the network execute a predetermined function, from the control apparatus; and
a communication unit for making the other device execute the function provided by the driver module, and transmitting/receiving data to/from the other device in association with the function under control of the control apparatus.

23. The device according to claim 22, wherein said network device performs one of an image scan function and an image print function, and the other device performs one of the image scan function and the image print function not performed by said network device.

24. A control method of a network device connected to a network together with a control apparatus, comprising:
a reception step of receiving a driver module, which makes another device connected to the network execute a predetermined function, from the control apparatus; and
a communication step of making the other device execute the function provided by the driver module, and transmitting/receiving data to/from the other device in association with the function under control of the control apparatus.

25. A computer-readable storage medium storing a control program for implementing a method of controlling a network device connected to a network together with a control apparatus, wherein the method comprises:

a reception step of receiving a driver module, which makes another device connected to the network execute a predetermined function, from the control apparatus; and a communication step of making the other device execute the function provided by the driver module, and transmitting/receiving data to/from the other device in association with the function under control of the control apparatus.

26. A driver server comprising:

a first storage unit for storing driver modules to be executed by a given device so as to allow the given device to use another device connected to a network; and a table for managing the driver modules stored in said first storage unit so as to be searchable by the given device.

27. The server according to claim 26, wherein said table is registered with device names used upon executing the driver modules stored in said first storage unit, types of services provided upon executing the driver modules, and identifiers of the driver modules.

28. The server according to claim 27, wherein, when a service request is received from the given device, a driver module corresponding to the requested service is sent to the given device.

29. A method of managing drivers, comprising:

a management step of storing driver modules to be executed by a given device so as to allow the given device to use another device connected to a network, and searchably managing the driver modules using a table; and a search step of searching the driver modules managed in said management step in response to a request from the given device.

30. The method according to claim 29, wherein the table is registered with device names used upon executing the driver modules, types of services provided upon executing the driver modules, and identifiers of the driver modules.

31. A computer-readable storage medium storing a computer program for implementing a method of managing drivers, wherein the method comprises:

a management step of storing driver modules to be executed by a given device so as to allow the given device to use another device connected to a network, and searchably managing the driver modules using a table; and a search step of searching the driver modules managed in said management step in response to a request from the given device.

* * * * *

UNITED STATES PATENT AND TRADEMARK OFFICE
CERTIFICATE OF CORRECTION

PATENT NO. : 6,714,998 B2
DATED : March 30, 2004
INVENTOR(S) : Katsuhiko Hara et al.

It is certified that error appears in the above-identified patent and that said Letters Patent is hereby corrected as shown below:

Drawings,
Sheet 21, Figure 21, "S1607 DATA TRANSFER" should read -- S2107 DATA TRANSFER --

Column 3,
Line 57, "incorporates" should read -- incorporated --.

Column 8,
Line 67, "In" should read -- ¶ In --.

Column 9,
Line 18, "form" should read -- from --.

Column 10,
Line 66, "user" should read -- use --.

Column 11,
Line 57, "computer 3" should read -- computer 13 --.

Column 14,
Line 41, "execut-" should read -- by execut --.

Signed and Sealed this

Nineteenth Day of October, 2004

JON W. DUDAS
*Director of the United States Patent and Trademark Office*